United States Patent
Takazane

(10) Patent No.: US 10,144,079 B2
(45) Date of Patent: Dec. 4, 2018

(54) SOLDERING SYSTEM

(71) Applicant: FANUC CORPORATION, Yamanashi (JP)

(72) Inventor: Tetsuhisa Takazane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/654,019

(22) Filed: Jul. 19, 2017

(65) Prior Publication Data
US 2018/0036820 A1    Feb. 8, 2018

(30) Foreign Application Priority Data

Aug. 2, 2016 (JP) .................................. 2016-152150

(51) Int. Cl.
| | |
|---|---|
| B23K 3/00 | (2006.01) |
| B23K 3/08 | (2006.01) |
| B23K 1/012 | (2006.01) |
| B23K 37/04 | (2006.01) |
| B23K 101/40 | (2006.01) |

(52) U.S. Cl.
CPC .............. B23K 3/08 (2013.01); B23K 1/012 (2013.01); B23K 37/04 (2013.01); *B23K 2101/40* (2018.08)

(58) Field of Classification Search
CPC .... B23K 1/012; B23K 1/0016; B23K 1/0053; B23K 37/04; B23K 3/06; B23K 3/08
USPC ........................................................ 228/220
See application file for complete search history.

(56) References Cited

U.S. PATENT DOCUMENTS

2015/0334849 A1*  11/2015  Tsubota ............... B23K 1/0016
                                                            228/220

FOREIGN PATENT DOCUMENTS

| DE | 10058237 A1 * | 5/2002 | ......... G01N 35/0099 |
|---|---|---|---|
| JP | S63-180194 U | 11/1988 | |
| JP | 05-146869 A | 6/1993 | |
| JP | 2007-044713 A | 2/2007 | |
| JP | 2016-096194 A | 5/2016 | |

OTHER PUBLICATIONS

Computer english translation of DE-10058237-A1 (Year: 2002).*
An Office Action dated by the Japanese Patent Office dated Jun. 19, 2018, which corresponds to Japanese Patent Application No. 2016-152150 and is related to U.S. Appl. No. 15/654,019.

* cited by examiner

*Primary Examiner* — Erin B Saad
(74) *Attorney, Agent, or Firm* — Studebaker & Brackett PC

(57) ABSTRACT

Provided is a soldering system that can raise the work efficiency related to the supply of a soldering target and soldering work, while decreasing the oxygen concentration by maintaining high airtightness in a space surrounding the soldering target. A soldering system includes a soldering device and a robot related to the soldering device, in which the soldering device is equipped with a container having an openable lid and accommodating a soldering target, and the robot performs conveying of the soldering target to the soldering device and opening/closing of the lid. In an embodiment of the soldering device, the container is a double structure in which an inner container is accommodated in an outer container, and a first nitrogen supply pipe and second nitrogen supply pipe, which are inert gas supply parts of separate systems, are respectively connected to the inner container and outer container.

6 Claims, 4 Drawing Sheets

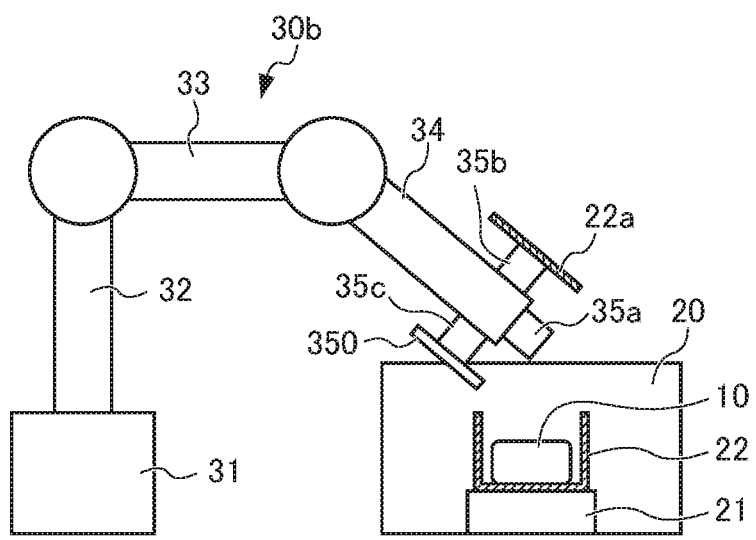

SOLDERING SYSTEM

This application is based on and claims the benefit of priority from Japanese Patent Application No. 2016-152150, filed on 2 Aug. 2016, the content of which is incorporated herein by reference.

BACKGROUND OF THE INVENTION

Field of the Invention

The present invention relates to a soldering system suited to use for performing soldering on a soldering target such as a semiconductor laser module, for example.

Related Art

Laser oscillators applied to laser processing machines used for cutting, welding, etc. of metals, resin materials and the like are built into semiconductor laser modules as the light source or light source for excitation. The semiconductor laser module couples (optically couples) a laser beam irradiated by the semiconductor laser element with optical fiber, to supply a laser to the laser oscillator through optical fiber. The semiconductor laser module is configured to have a housing and one or a plurality of semiconductor laser elements. In such a semiconductor laser module, soldering is used in the direct or indirect (via another member) fixing of the semiconductor laser module to the accommodated housing.

Soldering is performed under a nitrogen atmosphere reducing the oxygen concentration in order to prevent oxidation of the solder. If the solder oxidizes, the wettability of the solder will deteriorate, and phenomena occur such as the soldering not flowing out uniformly, and bubbles forming. In addition, the laser diodes may not be attached, or the laser diodes may fall off during use. Soldering is preferably conducted under an atmosphere filling with nitrogen a container surrounded so that a certain degree of airtightness is kept in order to lower the oxygen concentration. In practice, an opening is necessary for component supply and soldering operation, and thus it is not possible to completely seal.

On the one hand, if attempting a shortening of the cycle time by prioritizing component supply and workability of the soldering operation, there is concern over the airtightness inevitably declining, and the oxygen concentration rising. On the other hand, if raising the airtightness by prioritizing the lowering of the oxygen concentration, the component supply and soldering operation are greatly restricted, and there is concern over the cycle time lengthening.

In order to prevent oxidation of solder upon soldering, a proposal related to technology of lowering the oxygen concentration has also already been made (e.g., refer to Patent Document 1). Patent Document 1 discloses technology for performing supply of components serving as the targets of soldering by belt conveyer, raising the airtightness of the container by providing an opening/shutting mechanism at the component entrance, raising the nitrogen concentration of the soldering part, and decreasing the oxygen concentration. This technical disclosure suggests that a nitrogen atmosphere sufficient for soldering can be formed by equipping an opening/shutting mechanism that is not a completely sealed mechanism.

Patent Document 1: Japanese Unexamined Patent Application, Publication No. H05-146869

SUMMARY OF THE INVENTION

With the technology disclosed in Patent Document 1, the distance between the soldering part and the opening/shutting mechanism must be sufficiently separated, and thus a large space becomes necessary. In addition, if trying to quicken the cycle for increasing the productivity, during soldering work, component supply is performed and the opening/shutting mechanism is open, and thus there is concern over the oxygen concentration temporarily rising. In addition, although the supply of components serving as the targets of soldering is performed by belt conveyor, it is configured so as to expand a shutter, which is the opening/shutting mechanism of a shielding space, by the component itself that is conveyed by this belt conveyor. For this reason, it is difficult for the opening/shutting mechanism to adopt a configuration other than the shutter such as that disclosed in Patent Document 1, and there is no margin for applying an opening/shutting mechanism having higher airtightness.

The present invention has been made taking into account the above-mentioned such situation, and has an object of providing a soldering system that can raise the work efficiency related to supply of the soldering target and soldering work, while decreasing the oxygen concentration by maintaining high airtightness of a space surrounding the soldering target.

According to a first aspect of the present invention, a soldering system (e.g., the soldering system 1 described later) includes a soldering device (e.g., the soldering device 20 described later) and a robot (e.g., the robot 30 described later) related to the soldering device, in which the soldering device includes a container (e.g., the container 22 described later) having an openable lid (e.g., the lid 22a described later), and accommodating a soldering target (e.g., the soldering target 10 described later), and the robot performs conveying of the soldering target to the soldering device, and opening/closing of the lid.

According to a second aspect of the present invention, in the soldering system as described in the first aspect, the container may be a double structure in which an inner container (e.g., the inner container 221 described later) is accommodated in an outer container (e.g., the outer container 23 described later), and inert gas supply parts (e.g., the nitrogen supply pipes 24, 25 described later) of different systems may be connected to the inner container and the outer container.

According to a third aspect of the present invention, in the soldering system as described in the first or second aspect, the robot may have a gripping part (e.g., the first hand 35a and second hand 35b described later) that simultaneously grips a soldering target and the lid.

According to a fourth aspect of the present invention, in the soldering system as described in any one of the first to third aspect, the lid may have an opening (e.g., the opening 222 described later) for soldering work.

According to a fifth aspect of the present invention, in the soldering system as described in any one of the first to fourth aspect, the robot may have an inert gas injection part (e.g., the inert gas injection part 350 described later) for injecting inert gas, and may inject inert gas to inside of the container from the inert gas injection part prior to closing the lid.

According to a sixth aspect of the present invention, in the soldering system as described in the second aspect, the inert gas supply parts (e.g., the first nitrogen supply pipe 24 and second nitrogen supply pipe 25 described later) may supply inert gas in conjunction with opening and closing of the lid.

According to the present invention, it is possible to realize a soldering system that can raise the work efficiency related to supply of the soldering target and soldering work, while decreasing the oxygen concentration by maintaining high airtightness of a space surrounding the soldering target.

BRIEF DESCRIPTION OF THE DRAWINGS

FIG. 8 is a schematic block diagram showing a robot in the soldering system as yet another embodiment of the present invention.

DETAILED DESCRIPTION OF THE INVENTION

Figure 1:
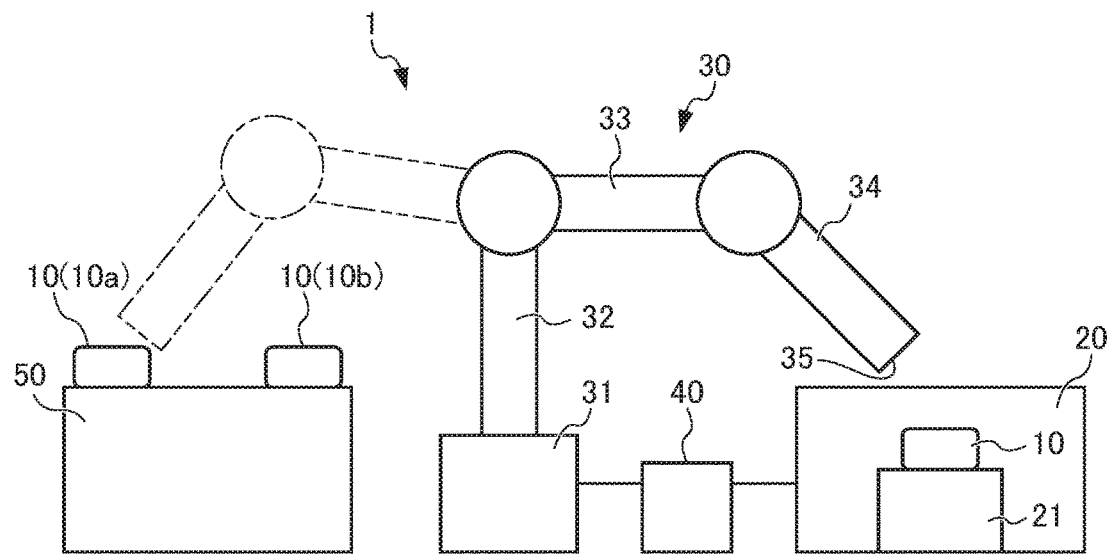
FIG. 1 is a schematic block diagram showing a soldering system as an embodiment of the present invention.

FIG. 1 is a schematic block diagram showing a soldering system as an embodiment of the present invention. The soldering system 1 is configured to include a soldering device 20, and a robot 30 related to this soldering device 20. The soldering device 20, for example, performs soldering on a soldering target 10, which is a semiconductor laser module or the like. The robot 30 is installed in connection with the soldering device 20 so as to perform conveying of the soldering target 10 and other work related to soldering. A stage 21 on which the soldering target 10 is placed is provided inside of the soldering device 20. The robot 30 operates under the control of a control device 40. In other words, the robot 30 includes the control device 40 and essentially functions as a robot, and the control device 40 can be perceived as being matter forming a constitutional element of the robot 30. In the soldering system 1 of the present embodiment, the soldering device 20 also operates under the control of the control device 40.

It should be noted that, in the soldering system 1 of FIG. 1, a component/finished product placement stand 50 is provided on which a soldering target 10 (10a) prior to soldering conveyed by the robot 30, and a soldering target 10 (10b) after soldering are placed. In the robot 30, a first arm 32 and second arm 33 extend in the order of the drawing from a robot base 31, and a hand mechanism 34 is provided to a leading end side of the second arm 33. A hand 35 is provided to a leading end side of the hand mechanism 34.

By the first arm 32 rotating on the robot base 31, and the second arm 33 and hand mechanism 34 moving from the position of the two-dot dashed line in the drawing to the position of the solid lines in the drawing under the control of the control device 40, the robot 30 conveys the soldering target 10a prior to soldering placed on the component/finished product placement stand 50 to the soldering device 20. The soldering device 20 performs soldering on the soldering target 10a. The soldered soldering target 10b is conveyed by the robot 30 to the component/finished production placement stand 50. The robot 30 conveys the next soldering target 10a to the soldering device 20.

In the soldering system 1 of FIG. 1, the component/finished product placement stand 50 is configured as an automatic conveying device such as a belt conveyor, and it is possible to construct a high productivity system that continuously performs supply of components that are the soldering target 10, and storage of finished product, by automatically carrying out and carrying in the soldering targets 10 from a storehouse by way of this automatic conveying device.

Figure 2:
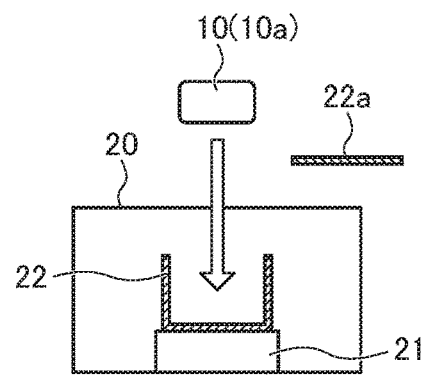
FIG. 2 is a view showing an aspect of supplying a soldering target to a container of the soldering system of FIG. 1.
Figure 3:
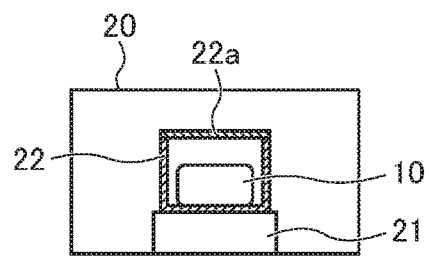
FIG. 3 is a view showing an aspect of supplying a soldering target to a container of the soldering system of FIG. 1.

Next, supply of the soldering target to the soldering device 20 will be explained in further detail by referencing FIGS. 2 and 3. FIG. 2 is a view showing an aspect of supplying the soldering target to a container of the soldering system of FIG. 1. FIG. 3 is a view showing an aspect of supplying the soldering target to the container of the soldering system of FIG. 1. In FIGS. 2 and 3, the soldering system 20 conceptually depicted in FIG. 1 is depicted more specifically. In FIGS. 2 and 3, the container 22 is placed on a stage 21 inside of the soldering device 20. The container 22 has a openable lid 22a, and is sealable in a state accommodating the soldering target 10. As in FIG. 2, work to open the lid 22a of the container 22, and supply the soldering target 10 to the inside of the container 22 is performed by the robot of FIG. 1. Operations for closing the lid 22a in a state accommodating the soldering target 10 are also performed by the robot 30. As in FIG. 3, an inert gas such as nitrogen gas, for example, is filled inside of the container 22 in which the lid 22a is closed in a state accommodating the soldering target 10, and the soldering work is performed in a state with sufficiently low oxygen concentration.

Figure 4:
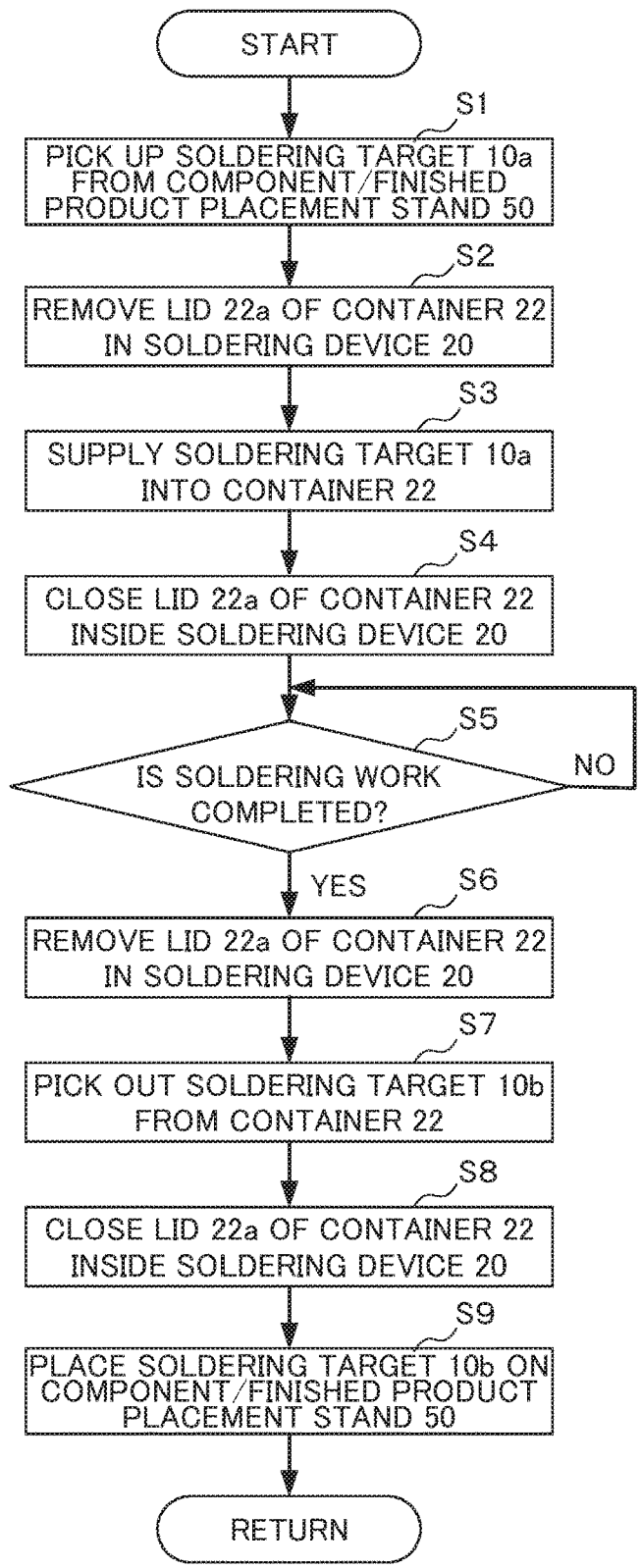
FIG. 4 is a flowchart of operations of a robot in the soldering system of FIG. 1.

Next, operations of the robot in the soldering system of FIG. 1 will be explained by referencing FIG. 4. FIG. 4 is a flowchart of operations of the robot in the soldering system of FIG. 1. When operation starts, the robot 30 picks up the soldering target 10a prior to soldering from the component/finished product placement stand 50 (Step S1). Next, the lid 22a of the container 22 inside of the soldering device 20 is removed (Step S2). Next, the robot 30 supplies the soldering target 10 prior to soldering to the inside of the container 22 (Step S3), and closes the lid 22a of the container 22 (Step S4). After Step S4, it stands by for the end of soldering (Step S5: NO), and after the end of soldering (Step S5: YES), the robot 30 removes the lid 22a of the container 22 (Step S6), and takes the soldering target 10b on which soldering has ended out from inside of the container 22 (Step S7). After Step S7, the robot 30 closes the lid 22a of the container 22 (Step S8), and places the soldering target 10b on which soldering has ended onto the component/finished product placement stand 50 (Step S9). Subsequent operations are the repeat from the start described above.

Figure 5:
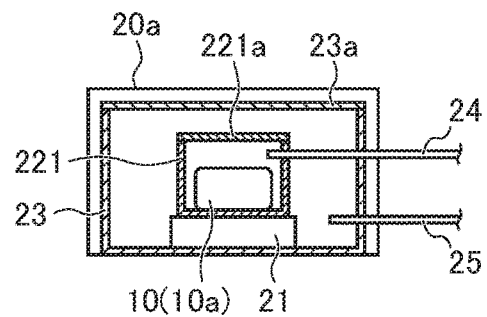
FIG. 5 is a schematic block diagram showing a soldering device applied to the soldering system as another embodiment of the present invention.

Next, the container applied to the soldering system as another embodiment of the present invention will be explained by referencing FIG. 5. FIG. 5 is a schematic block diagram showing the container applied to the soldering system as another embodiment of the present invention. A soldering device 20a of FIG. 5 has a double structure in which an inner container 221 placed on the stage 21 is accommodated in an outer container 23. An openable lid 221a is equipped to the inner container 221, similarly to the container 22 described earlier, and an openable lid 23a is equipped to the outer container 23, similarly. A first nitrogen supply pipe 24 as an inert gas supply part is connected to the inner container 221. In addition, a second nitrogen supply pipe 25 as an inert gas supply part is connected to the outer container 23. The first nitrogen supply pipe 24 and second nitrogen supply pipe 25 are independent as separate systems, and can control the supply of nitrogen gas individually (supply amount and supply timing).

In the soldering device 20a of FIG. 5, the soldering target 10a prior to soldering is supplied to the soldering device 20a, and after closing the lid 221a of the inner container 221, the supply of nitrogen from the first nitrogen supply pipe 24 is started. Next, after closing the lid 23a of the outer container 23, the supply of nitrogen from the second nitrogen supply pipe 25 is started. The supply timing of inert gas (nitrogen gas) can be appropriately regulated by controlling valves (not illustrated) provided to the first nitrogen supply pipe 24 and second nitrogen supply pipe 25, respectively, from the control device 40.

With the soldering device 20a of FIG. 5, the supply of inert gas (nitrogen gas) from the first nitrogen supply pipe 24 as the inert gas supply part is performed in conjunction with opening and closing of the lid 221a, as mentioned above. In addition, the supply of inert gas (nitrogen gas) from the second nitrogen supply pipe 25 as an inert gas supply part is performed in conjunction with opening and closing of the lid 23a. It is recommended that the configuration performing supply of inert gas (nitrogen gas) from the inert gas supply part in conjunction with opening and closing of the lid of the container in this way is similarly adopted for the soldering devices 20 in the aforementioned FIGS. 2 and 3, and FIGS. 6 and 8 described later.

In a state in which the lid of the container is opened, since the effect of decreasing the oxygen concentration is low even if supplying nitrogen, the supply of nitrogen is started after closing the lid. Furthermore, after the oxygen concentration sufficiently declines, it is possible to reduce the supply of nitrogen to a supply amount sufficient to maintain this state. By controlling so that the supply of nitrogen becomes optimum according to the operation stage, it is possible to curtail the consumed amount of nitrogen.

It should be noted that the soldering device 20a of FIG. 5 is equipped with the first nitrogen supply pipe 24 and second nitrogen supply pipe 25 as inert gas supply parts; however, the inert gas supply part is not limited thereto, and may be a supply pipe for argon gas or the like. However, generally nitrogen gas is more cost effective. The supply amount of nitrogen gas to the inner container 221 and outer container 23 by the first nitrogen supply pipe 24 and second nitrogen supply pipe 25 is adjusted so as to have optimum values according to the shape, etc., and the oxygen concentration at the soldering site of the soldering target 10 is the lowest value. The soldering device 20a of FIG. 5 has containers of a double structure; however, it is possible to establish in a triple structure or multi-walled structure more than this.

Figure 6:
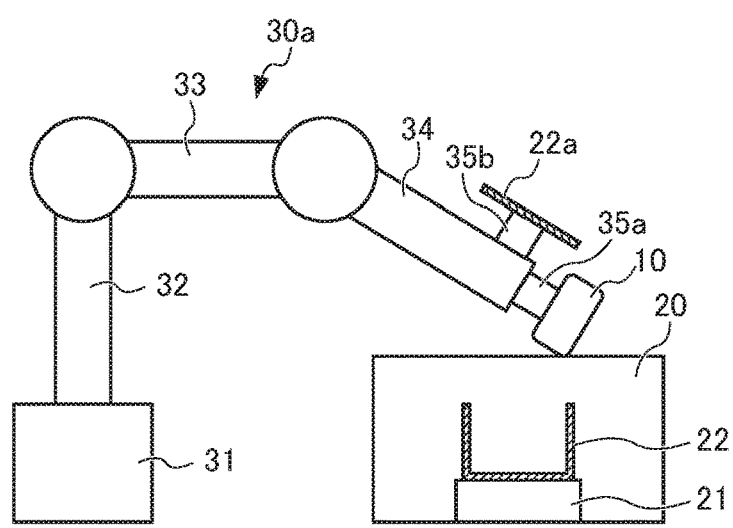
FIG. 6 is a schematic block diagram showing a robot in a soldering system as yet another embodiment of the present invention.

Next, the robot applied to the soldering system as another embodiment of the present invention will be explained by referencing FIG. 6. FIG. 6 is a schematic block diagram showing the robot of the soldering system as yet another embodiment of the present invention. Parts in FIG. 6 that correspond with the aforementioned FIGS. 1 and 2 are illustrated with the same reference symbols attached, and explanations of each of these parts will be omitted as appropriate.

A robot 30a in FIG. 6 is common with the robot 30 of FIG. 1 in the point of the first arm 32 and second arm 33 extending in order in the drawing from the robot base 31, and the hand mechanism 34 being provided to a leading end side of the second arm 33. The robot 30a of FIG. 6 in particular has a first hand 35a and second hand 35b at the leading end side of the hand mechanism 34. The first hand 35a is well suited to the handling of the soldering target 10, and the second hand 35b is well suited to the handling of the lid 22a; however, both hands 35a, 35b can be hands that are well suited to the handling of various targets.

The robot 30a can simultaneously grip the soldering target 10 and the lid 22a. To grip the target by the first hand 35a and second hand 35b, a technique such as vacuum suction or pneumatic chuck is applied. In a state gripping the lid 22a by the second hand 35b, it is possible to pick out the soldering target 10 from the container 22 by the first hand 35a. In addition, opening/closing of the lid 22a is possible by the second hand 35b in a state gripping the soldering target 10 with the first hand 35a. In this way, a design which avoids interference between handling features is made. By simultaneously gripping the lid 22a and soldering target 10, it is no longer necessary to temporarily put down the lid 22a and soldering target 10, and then move to the next operation; therefore, the cycle time is shortened.

Figure 7:
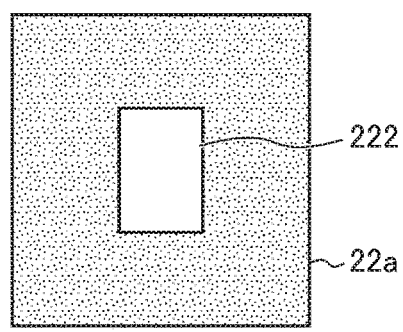
FIG. 7 is a schematic block diagram showing a lid of a container of the soldering device applied to the soldering system as yet another embodiment of the present invention.

Next, the lid of the container of the soldering device applied to the soldering system as another embodiment of the present invention will be explained by referencing FIG. 7. FIG. 7 is a schematic block diagram showing a lid of the container of the soldering device applied to the soldering system as yet another embodiment of the present invention. In the lid 22a of FIG. 7, an opening 222 for soldering work is provided at a central part. Generally, a lid without an opening has higher airtightness, and is preferable in this point. However, there are cases in which the opening 222 is required for the soldering work on the soldering target 10 by the soldering device 20, and the supply operation of the soldering device 10 by the robot 30. There are cases such as accessing the soldering target 10 from the opening 222, and supplying other members from the opening 222. Since as small an opening 222 as possible in the lid 22a has higher airtightness, adopting the lid 22a providing the minimum required opening 222 is effective in an oxygen concentration decrease.

Next, the robot applied to the soldering system as another embodiment of the present invention will be explained by referencing FIG. 8. FIG. 8 is a schematic block diagram showing the robot of the soldering system as yet another embodiment of the present invention. A robot 30b in FIG. 8 is common with the robots 30, 30a of FIGS. 1 and 6 in the point of the first arm 32 and second arm 33 extending in order in the drawing from the robot base 31, and the hand mechanism 34 being provided to a leading end side of the second arm 33. The robot 30b of FIG. 8 in particular has a first hand 35a, second hand 35b and third hand 35c at the leading end side of the hand mechanism 34. The first hand 35a is well suited to handling of the soldering target 10, and the second hand 35b is well suited to handling of the lid 22a; however, both the hands 35a, 35b are common with the robot of FIG. 6 in the point of being hands well suited to the handling of various targets.

An inert gas injection part 350 for injecting inert gas is equipped to the third hand 35c of the robot 30b in FIG. 8. With the robot 30b, inert gas (for example, nitrogen gas) is injected inside of the container 22 of the soldering device 20 by the inert gas injection part 350. By closing the lid 22a of the container 22 immediately after injecting inert gas, the oxygen concentration is lower and the oxygen concentration inside of the container more rapidly decreases, than a case of not performing injection of inert gas inside of the container 22. In addition, at a stage in which the robot 30b is approaching the soldering device 20, the injection of inert gas is started, and injection is continued until closing the lid 22a, whereby it is possible to more rapidly decrease the oxygen concentration. Although the supply of the soldering target 10 and the opening/closing operation of the lid 22a by the robot 30a, in a state in which the lid 22a is opened, introduce oxygen to the inside of the container 22, by continuing the injection of inert gas, it is possible to maintain a low oxygen concentration in the vicinity of the first and second hands 35a, 35b. By the oxygen concentration more rapidly decreasing in this way, it is possible to start the soldering work earlier, and thus it is possible to shorten the cycle time.

The effects of the soldering system as an embodiment of the present invention explained by referencing FIGS. 1 to 8 above will be summarized next.

(1) The soldering system 1 of the present invention includes the soldering device 20 and robot 30 related to the soldering device 20, in which the soldering device 20 includes the container 22 having an openable lid 22a, and accommodating the soldering target 10, and the robot 30 performs conveying of the soldering target 10 to the soldering device 20, and opening/closing of the lid 22a.

With the soldering system 1 of the above-mentioned (1), the overall productivity improves due to the stable production of the soldered product according to the oxygen concentration decline, and the continuous production due to component automatic supply. Since the robot 30 does the handling of the lid 22a, it is possible to assume a simple structure, the sealing performance of the lid 22 also improves, and an opening/shutting actuator such as a power cylinder also becomes unnecessary.

(2) In the soldering system 1 of the present invention, the container of the soldering device 20a in one embodiment thereof is a double structure in which the inner container 221 is accommodated in the outer container 23, and the first nitrogen supply pipe 24 and second nitrogen supply pipe 25, which are inert gas supply parts of separate systems, are respectively connected to the inner container 221 and outer container 23.

In the soldering system 1 of the above-mentioned (2), due to the container being two layers, it is possible to cause the oxygen concentration to more rapidly decline while purging with inert gas (nitrogen, argon, etc.).

(3) In the soldering system 1 of the present invention, in one embodiment thereof, the robot 30a has the first hand 35a and second hand 35b which simultaneously grip the soldering target 10 and lid 22a.

In the soldering system 1 of the above-mentioned (3), since the robot 30a can simultaneously grip the soldering target 10 and the lid 22a of the container 22, it is possible to close the lid 22a immediately after supplying the soldering target 10 to the soldering device 20. In addition, after opening the lid 22a, since it is possible to pick out the soldering target 10 immediately, the cycle time is shortened.

(4) In the soldering system 1 of the present invention, in one embodiment thereof, the lid 22a has the opening 222 for soldering work.

In the soldering system 1 of the above-mentioned (4), the point of the opening required for soldering work generally being smaller than the opening required for component supply is considered. In other words, by using the lid 22a having the opening 222 required in soldering, the opening becomes smaller than when completely opening the lid 22a, and thus it is possible to cause the oxygen concentration to further decline.

(5) In the soldering system 1 of the present invention, in one embodiment thereof, the robot 30b has the inert gas injection part 350 for injecting inert gas, and injects inert gas to the inside of the container 22 from the inert gas injection part 350 prior to closing the lid 22a.

In the soldering system 1 of the above-mentioned (5), by purging the inside of the container 22 with nitrogen, which is inert gas, prior to closing the lid 22a, it is possible to more rapidly achieve the target oxygen concentration, and thus the cycle time is shortened.

(6) In the soldering system 1 of the present invention, in one embodiment thereof, the inert gas supply part (first nitrogen supply pipe 24, second nitrogen supply pipe 25) supplies inert gas (nitrogen gas) in conjunction with the opening/closing of the lid 22a (221a, 23a).

In the soldering system 1 of the above-mentioned (6), it is possible to curb the consumed amount of nitrogen by supplying nitrogen only while closing the lid 22a (221a, 23a).

It should be noted that the present invention is not to be limited to the aforementioned embodiments, and is implementable by various modifications and changes. For example, in the embodiment of the aforementioned FIG. 1, an example is explained in which the control device is provided outside of the robot; however, it is not limited to this example, and it is possible to adopt a form in which the robot includes a control device function as mentioned above. Additionally, modifications and improvements within a scope that can achieve the objects of the present invention are also encompassed by the present invention.

EXPLANATION OF REFERENCE NUMERALS 1 soldering system
10, 10a, 10b soldering target
20 soldering device
22 container
22a lid
23 outer container
24 first nitrogen supply pipe
25 second nitrogen supply pipe
30 robot
35 hand
35a first hand
35b second hand
40 control device
221 inner container
221a lid
222 opening
350 inert gas injection part

What is claimed is:
1. A soldering system comprising a soldering device and a robot related to the soldering device, wherein
the soldering device includes a container having an openable lid, and accommodating a soldering target, and the soldering device is configured to perform soldering work on the soldering target, and
the robot performs conveying of the soldering target to the soldering device and performs opening and/or closing of the lid.

2. The soldering system according to claim 1,
wherein the container is a double structure in which an inner container is accommodated in an outer container, and inert gas supply parts are connected to each of the inner container and the outer container to supply inert gas from different inert gas supply systems to the inner container and outer container, respectively.

3. A soldering system comprising a soldering device and a robot related to the soldering device, wherein
the soldering device includes a container having an openable lid, and accommodating a soldering target,
the robot performs conveying of the soldering target to the soldering device and performs opening and/or closing of the lid, and
the robot has a gripping part that simultaneously grips a soldering target and the lid.

4. The soldering system according to claim 1, wherein the lid has an opening for performing the soldering work on the soldering target.

5. A soldering system comprising a soldering device and a robot related to the soldering device, wherein
the soldering device includes a container having an openable lid, and accommodating a soldering target,
the robot performs conveying of the soldering target to the soldering device and performs opening and/or closing of the lid, and
the robot has an inert gas injection part for injecting inert gas, and injects inert gas to inside of the container from the inert gas injection part prior to closing the lid.

6. The soldering system according to claim 2,
wherein the inert gas supply parts supply inert gas in conjunction with opening and/or closing of the lid.

* * * * *